Patented July 22, 1952

2,604,470

UNITED STATES PATENT OFFICE 2,604,470

PHOSPHORYLATION OF DIHYDRO-RIBOFLAVIN

Leo A. Flexser, Upper Montclair, and Walter G. Farkas, Nutley, N. J., assignors to Hoffmann-La Roche Inc., Nutley, N. J., a corporation of New Jersey No Drawing. Application July 15, 1950, Serial No. 174,121

10 Claims. (Cl. 260—211.3)

This invention relates to a novel method for preparing the monophosphoric acid ester of dihydro-riboflavin. This ester can be readily oxidized to the useful and physiologically important monophosphoric acid ester of riboflavin. Accordingly, our invention also embraces the steps of phosphorylating dihydro-riboflavin to form the monophosphoric acid ester of dihydro-riboflavin and oxidizing the latter to form the monophosphoric acid ester of riboflavin.

Our invention offers the additional advantage that it employs the readily accessible dihydro-riboflavin as a starting material. Dihydro-riboflavin is more readily obtained than riboflavin itself from dilute aqueous solutions since it is much less soluble and is, therefore, more easily isolated than riboflavin from fermentation process liquors or other dilute solutions.

In our copending application Ser. No. 141,585, filed January 31, 1950, now abandoned, we disclose that riboflavin may be phosphorylated by chlorophosphoric acids to yield various products which comprise mono(monochlorophosphoric acid) salts and mono(dichlorophosphoric acid) salts of riboflavin monoesters of phosphoric acid, polyphosphoric acids, chlorine-containing phosphoric acid, and chlorine-containing polyphosphoric acids. These phosphorylated riboflavin compounds may all be hydrolyzed to the monophosphoric acid ester of riboflavin. The new method disclosed in our aforementioned application for phosphorylating riboflavin consists of pretreating phosphorus oxychloride (POCl$_3$) with water to form a chlorophosphoric acid in which riboflavin is soluble and whereby it is readily phosphorylated at room temperature. The chlorophosphoric acids are readily prepared by reacting phosphorus oxychloride with about 1 to 2 moles of water. The treatment of phosphorus oxychloride with water follows the course:

POCl$_3$ + H$_2$O → HOPOCl$_2$ + HCl
POCl$_3$ + 2H$_2$O → (HO)$_2$POCl + 2HCl

We have now discovered that dihydro-riboflavin, in spite of its having a lower solubility than riboflavin, may also be phosphorylated by the process disclosed for riboflavin in the aforesaid copending application Ser. No. 141,585. The resultant products may also be hydrolyzed to the monophosphoric acid ester of dihydro-riboflavin, which can in turn be oxidized to produce the monophosphoric acid ester of riboflavin.

Preferably, the reaction is carried out with an excess of phosphorylating agent and for a sufficient length of time to insure that no dihydro-riboflavin remains unphosphorylated. The products which are thereupon obtained contain at least two atoms of phosphorus and at least one chlorine atom. The extent of the polyphosphorylation depends upon the length of time the dihydro-riboflavin is allowed to react with the water-pretreated POCl$_3$. In the case of POCl$_3$ pretreated with one mole of water, the reactions may be formulated thus:

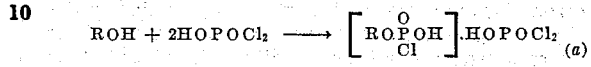

wherein ROH represents dihydro-riboflavin.

The above monochlorophosphorylated dihydro-riboflavin chlorophosphate may then be further chlorophosphorylated depending upon the reaction time as follows:

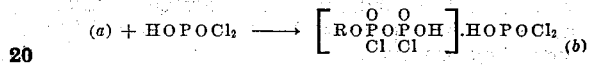

and/or

Compounds (b) and (c) may be further phosphorylated.

In the case of POCl$_3$ pretreated with 2 moles of water the corresponding reactions are:

Upon further treatment with the 2H$_2$O pretreated POCl$_3$, the following occurs:

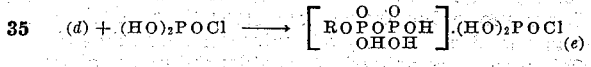

Compound (e) can be further phosphorylated.

The products in accordance with our novel process comprise mono(monochlorophosphoric acid) salts and mono(dichlorophosphoric acid) salts of dihydro-riboflavin monoesters of phosphoric acid, polyphosphoric acids, chlorine-containing phosphoric acid and chlorine-containing polyphosphoric acids.

Hydrolysis of any of the intermediates produced with the chlorophosphoric acids results first in the splitting off of the salt-forming HOPOCl$_2$ or (HO)$_2$POCl, as the case may be, followed by liberation of dihydro-riboflavin monophosphoric acid ester designated correspondingly as ROPO(OH)$_2$. The extent of polyphosphorylation makes no difference, as in all cases the final hydrolysis product is the said dihydro-riboflavin monophosphoric acid ester. While the main product is a 5' ester, a minor portion of dihydro-riboflavin (2'), (3'), or (4'), monophosphoric acid ester may also be formed.

It is to be understood that we do not wish to limit ourselves by the above theoretical interpretation of the formation of our new dihydro-riboflavin compounds containing phosphorus and chlorine, but rather intend it as a reasonable explanation of the reaction which may be involved. The reactions given herein set forth a synthesis with postulated structures for the intermediates involved. It will be understood that although the outline given above is based upon what we consider to be the most probable course of reaction, we do not wish to limit our invention to any specific theory of reaction or structure of products.

While the aforementioned dihydro-riboflavin ester salts may be isolated for purposes of purification or for preparation of the derivatives thereof (for instance for reaction with ammonia), it is not necessary to effect such isolation for the preparation of the riboflavin monophosphoric acid ester. In the latter instance, the reaction mixture after phosphorylation of the dihydro-riboflavin by the water-pretreated $POCl_3$, is simply added to several volumes of water to hydrolyze the dihydro-riboflavin ester salts to the dihydro-riboflavin monophosphoric acid ester and the latter compound while still in solution, oxidized, for example, with hydrogen peroxide to the stable riboflavin monophosphoric acid ester. The latter substance is then readily isolated from the solution by crystallization.

The following example is illustrative of our novel method of preparing dihydro-riboflavin monophosphoric acid ester, riboflavin monophosphoric acid ester and the new intermediate products. It is intended that this example be illustrative of the process and not restrictive of the scope of our invention.

*Example*

To 61.3 grams (0.4 mole) of phosphorus oxychloride were added slowly, with good agitation and with cooling to about room temperature, 7.2 grams (0.4 mole) of water. The mixture was stirred until evolution of hydrogen chloride gas appeared mostly finished and allowed to stand overnight (about 16 hours). Then 3.78 grams of dihydro-riboflavin were added with stirring. Solution occurred after a short time and HCl was evolved. The solution was stirred for 5 hours at room temperature. It was then poured into 600 cc. of water. To the solution of dihydro-riboflavin monophosphoric acid ester thus obtained was added a quantity of hydrogen peroxide sufficient to cause oxidation as evidenced by the color change to typical yellow and the appearance of typical fluorescence of riboflavin monophosphoric acid ester. Upon standing, riboflavin monophosphoric acid ester crystallized. The compound melted at about 195° C., and analyzed correctly for the monophosphoric acid ester of riboflavin corresponding to the formula $C_{17}H_{19}N_4O_6PO_3H_2$. The optical rotation of a two per cent solution in concentrated hydrochloric acid was $$\alpha 1_D^{28°} = +44.5°$$

On potentiometric titration with sodium hydroxide, a well-defined point of inflection in the titration curve was obtained at pH 4.5 upon the addition of exactly one equivalent of alkali. A second inflection point at pH 8.5 was obtained upon the addition of a second equivalent of alkali.

We claim:
1. A process of phosphorylating dihydro-riboflavin which comprises reacting dihydro-riboflavin with a member selected from the group consisting of the two acids represented by the formulae $(HO)_2POCl$ and $HOPOCl_2$.
2. A process of phosphorylating dihydro-riboflavin which comprises reacting dihydro-riboflavin with the acid represented by the formula $(HO)_2POCl$.
3. A process of phosphorylating dihydro-riboflavin which comprises reacting dihydro-riboflavin with the acid represented by the formula $HOPOCl_2$.
4. A process of phosphorylating dihydro-riboflavin which comprises reacting dihydro-riboflavin with a member selected from the group consisting of the two acids represented by the formulae $(HO)_2POCl$ and $HOPOCl_2$, and hydrolyzing the reaction product to produce dihydro-riboflavin-5'-monophosphoric acid ester.
5. A process of phosphorylating dihydro-riboflavin which comprises reacting dihydro-riboflavin with the acid represented by the formula $(HO)_2POCl$, and hydrolyzing the reaction product to produce dihydro-riboflavin-5'-monophosphoric acid ester.
6. A process of phosphorylating dihydro-riboflavin which comprises reacting dihydro-riboflavin with the acid represented by the formula $HOPOCl_2$, and hydrolyzing the reaction product to produce dihydro-riboflavin-5'-monophosphoric acid ester.
7. A process of phosphorylating dihydro-riboflavin which comprises reacting dihydro-riboflavin with a member selected from the group consisting of the two acids represented by the formulae $(HO)_2POCl$ and $HOPOCl_2$, hydrolyzing the reaction product to produce dihydro-riboflavin-5'-monophosphoric acid ester, and oxidizing the dihydro-riboflavin-5'-monophosphoric acid ester to produce riboflavin-5'-monophosphoric acid ester.
8. A chlorine-containing product produced according to the process of claim 1.
9. A chlorine-containing product produced according to the process of claim 2.
10. A chlorine-containing product produced according to the process of claim 3.

LEO A. FLEXSER.
WALTER G. FARKAS.

REFERENCES CITED

The following references are of record in the file of this patent:

UNITED STATES PATENTS

| Number | Name | Date |
|---|---|---|
| 2,052,029 | Harris | Aug. 25, 1936 |
| 2,111,491 | Kuhn | Mar. 15, 1938 |
| 2,224,695 | Prutton | Dec. 10, 1940 |
| 2,256,380 | Dickey | Sept. 16, 1941 |
| 2,394,829 | Whitehill et al. | Feb. 12, 1946 |
| 2,490,573 | Atherton | Dec. 6, 1949 |
| 2,535,385 | Bewogel | Dec. 26, 1950 |

FOREIGN PATENTS

| Number | Country | Date |
|---|---|---|
| 404,684 | Great Britain | Jan. 8, 1934 |

OTHER REFERENCES

Chem. Abst., vol. 39 (1945), page 2734, citing J. Chem. Soc. (1945), pages 106–12.